US012145581B2

(12) United States Patent
Yang

(10) Patent No.: US 12,145,581 B2
(45) Date of Patent: Nov. 19, 2024

(54) COLLISION INDICATION BASED ON YAW RATE AND LATERAL VELOCITY THRESHOLDS

(71) Applicant: Aptiv Technologies AG, Schaffhausen (CH)

(72) Inventor: Mingda Yang, Rochester Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 280 days.

(21) Appl. No.: 17/643,814

(22) Filed: Dec. 10, 2021

(65) Prior Publication Data

US 2023/0182724 A1 Jun. 15, 2023

(51) Int. Cl.
*B60W 30/09* (2012.01)
*B60W 30/095* (2012.01)
(Continued)

(52) U.S. Cl.
CPC ........ *B60W 30/0956* (2013.01); *B60W 30/09* (2013.01); *B60W 40/072* (2013.01); *B60W 40/105* (2013.01); *B60W 40/114* (2013.01); *B60W 50/0097* (2013.01); *B60W 2050/0054* (2013.01); *B60W 2520/125* (2013.01);
(Continued)

(58) Field of Classification Search
CPC ............. B60W 30/0956; B60W 30/09; B60W 40/072; B60W 40/105; B60W 40/114; B60W 50/0097; B60W 2552/30; B60W 2554/80; B60W 2554/4043;
(Continued)

(56) References Cited

U.S. PATENT DOCUMENTS 8,775,063 B2   7/2014  Zeng
8,903,588 B2  12/2014  Schmudderich et al.
(Continued)

FOREIGN PATENT DOCUMENTS

CN   113715814 A   11/2021
EP      3018026    5/2016
EP   3437947 A1    2/2019

OTHER PUBLICATIONS

"Extended European Search Report", EP Application No. 22197729.1, May 4, 2023, 8 pages.

*Primary Examiner* — Yufeng Zhang
(74) *Attorney, Agent, or Firm* — Harness, Dickey & Pierce, P.L.C.

(57) ABSTRACT

The techniques and systems herein enable collision indication based on yaw rate and lateral velocity thresholds. Specifically, an in-path band is determined for a predicted path of a host vehicle. Responsive to determining that a target is within the in-path band, a lateral movement for the host vehicle at a time is determined based on whether a yaw rate of the host vehicle meets a yaw rate threshold. A lateral movement for the target at the time is also determined based on whether a lateral velocity of the target meets a lateral velocity threshold. A collision indication is generated responsive to determining, based on the lateral movements, that the host vehicle and the target are likely to be within the in-path band at the time. In this way, the collision indication more accurately reflects an imminent collision, thereby increasing safety while also mitigating false-positive events.

22 Claims, 5 Drawing Sheets

(51) Int. Cl.
    *B60W 40/072*     (2012.01)
    *B60W 40/105*     (2012.01)
    *B60W 40/114*     (2012.01)
    *B60W 50/00*     (2006.01)

(52) U.S. Cl.
    CPC ..... *B60W 2520/14* (2013.01); *B60W 2552/30* (2020.02); *B60W 2554/4043* (2020.02); *B60W 2554/80* (2020.02)

(58) Field of Classification Search
    CPC ... B60W 2050/0054; B60W 2520/125; B60W 2520/14; B60W 30/0953
    See application file for complete search history.

(56) References Cited

U.S. PATENT DOCUMENTS

| | | | |
|---|---|---|---|
| 2020/0180616 A1* | 6/2020 | Matsunaga | B60W 30/0956 |
| 2020/0324762 A1 | 10/2020 | Pfadler et al. | |
| 2022/0161849 A1* | 5/2022 | Kubota | B62D 15/025 |

* cited by examiner

COLLISION INDICATION BASED ON YAW RATE AND LATERAL VELOCITY THRESHOLDS

BACKGROUND

Determining whether collisions with target objects are imminent is important for many vehicle operations (e.g., advanced driver assistance systems (ADAS), automatic emergency-braking (AEB), enhanced steering-assist (ESA), semi-autonomous driving technologies, autonomous driving technologies). For example, when an imminent collision is determined, an AEB system may apply a braking force or an ESA system may provide a steering input to avoid the collision. Accurately determining imminent collisions not only mitigates actual threats (e.g., those that would have resulted in a collision) but also minimizes false positives (e.g., those that would not have resulted in a collision). Conventional techniques are unable to accurately determine imminent collisions in some situations. Consequently, downstream operations (e.g., ADAS, AEB, ESA) are negatively affected, which can lead to decreased safety and/or user experience.

SUMMARY

This document is directed to systems, components, techniques, and methods for enabling collision indication based on yaw rate and lateral velocity thresholds. The techniques and methods described herein may be performed by the systems and/or components. The systems and components include means (e.g., processing systems) for performing the techniques and methods described herein.

Some aspects described below include a method that includes determining a predicted path of a host vehicle and an in-path band for the predicted path. The method also includes determining whether a target is within the in-path band and, responsive to determining that the target is within the in-path band, determining a host lateral movement based on whether the yaw rate of the host vehicle meets a yaw rate threshold and determining, based on the host lateral movement and the in-path band, whether the host vehicle is likely to be within the in-path band at a future time. The method further includes determining a target lateral movement based on whether a lateral velocity of the target meets a lateral velocity threshold and determining, based on the target lateral movement and the in-path band, whether the target is likely to be within the in-path band at the future time. The method also includes, responsive to determining that the host vehicle and the target are likely to be within the in-path band at the future time, generating a collision indication and causing the host vehicle to perform an action. Other aspects described below include a system for performing the above method and computer-readable storage media including instructions that, when executed by at least one processor, cause the processor to perform the above method.

This Summary introduces simplified concepts for enabling collision indication based on yaw rate and lateral velocity thresholds that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques for enabling collision indication based on yaw rate and lateral velocity thresholds are described with reference to the following drawings that use some of the same numbers throughout to reference like or examples of like features and components.

DETAILED DESCRIPTION

Overview

Accurately determining imminent collisions with targets is an important tool in many vehicle operations. Various situations often cause conventional collision determinations to be inaccurate. For example, some techniques rely only on a yaw rate of the host vehicle or inputs from multiple sensors to determine imminent collisions with targets. Such techniques are often unreliable (e.g., they can produce too many false-positive collision determinations) or too slow in determining imminent collisions to allow enough time for appropriate reactions from downstream operations.

The techniques and systems herein enable collision indication using an in-path band in conjunction with lateral movement estimations that are based on yaw rate and lateral velocity thresholds. Specifically, an in-path band is determined for a predicted path of a host vehicle. Responsive to determining that a target is within the in-path band, a lateral movement for the host vehicle at a time is estimated based on whether a yaw rate of the host vehicle meets a yaw rate threshold. A lateral movement for the target at the time is also estimated based on whether a lateral velocity of the target meets a lateral velocity threshold. A collision indication is generated responsive to determining, based on the lateral movements, that the host vehicle and the target are likely to be within the in-path band at the time. By determining the lateral movements based on whether the thresholds are met, the collision indication more accurately reflects an imminent collision, thereby increasing safety while also mitigating false-positive events. In this way, downstream operations (e.g., ADAS, AEB, ESA) operate with improved safety and user experience.

Example Environment

Figure 1:
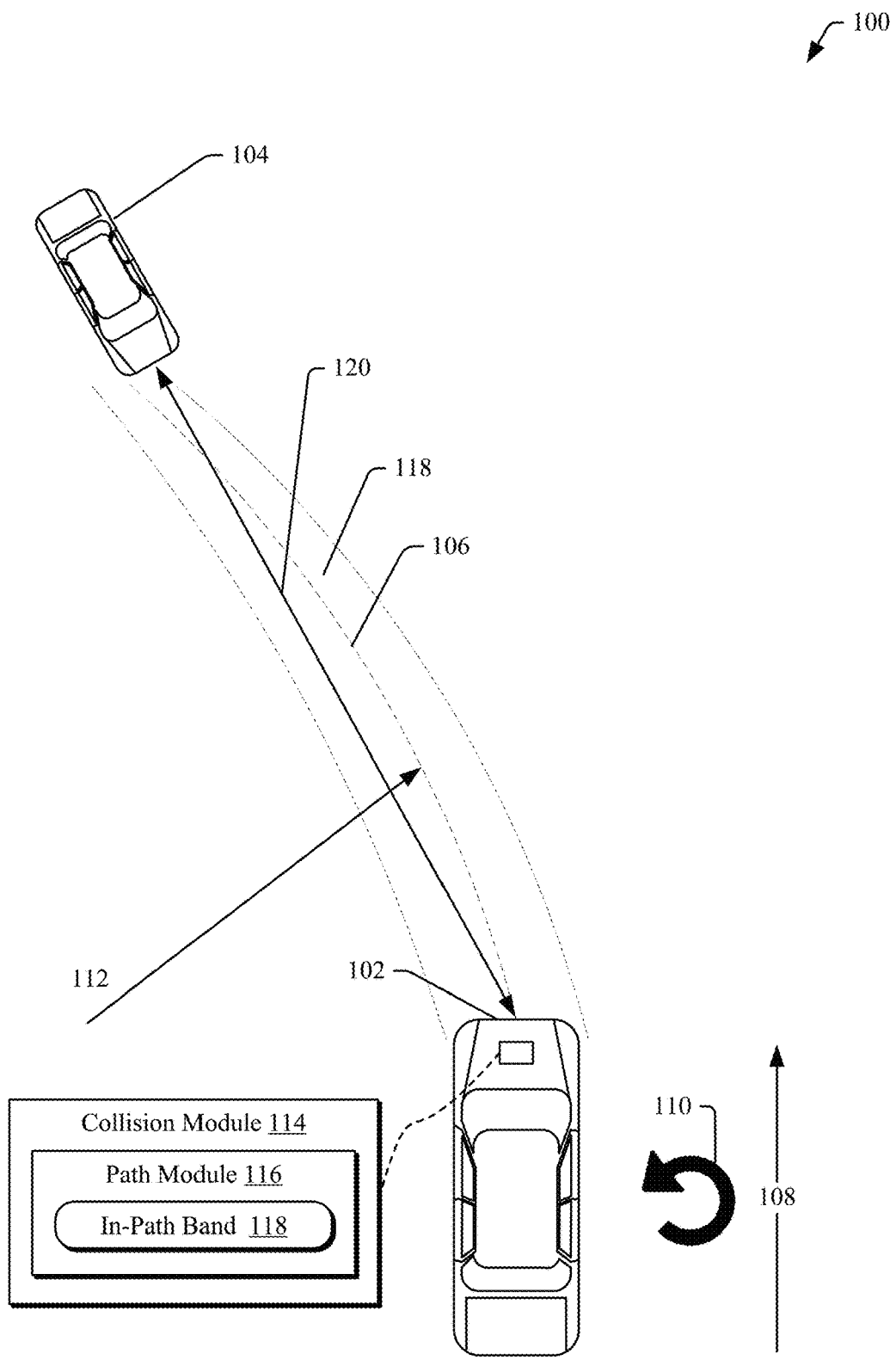
FIG. 1 illustrates, in accordance with techniques of this disclosure, an example environment where collision indication based on yaw rate and lateral velocity thresholds may be used.

FIG. 1 illustrates an example environment 100 where collision indication based on yaw rate and lateral velocity thresholds may be used. The example environment 100 contains a host vehicle 102 and a target 104. The host vehicle 102 may be any type of system (e.g., automobile, car, truck, motorcycle, e-bike, boat, air vehicle). The target 104 may be any type of moving or stationary object (e.g., automobile, car, truck, motorcycle, e-bike, boat, pedestrian, cyclist, boulder). The host vehicle 102 can detect the target 104 using one or more sensor systems (e.g., radar sensors, vision sensors, lidar sensors).

The host vehicle 102 is traveling along a path 106 (e.g., a predicted path) with a host velocity 108 and a host yaw rate 110. As illustrated, the path 106 is curved with a radius 112. The host yaw rate 110 and the host velocity 108 may be used to predict or otherwise determine the path 106 and/or the radius 112. It should be noted that the path 106 may be straight or any other shape without departing from the scope of this disclosure.

A collision module 114 of the host vehicle 102, that is implemented at least partially in hardware, contains a path module 116 that determines an in-path band 118. The in-path band 118 is a lateral band that is centered on the path 106 and regressive in width along the path 106 away from the host vehicle 102. The amount of width regression of the in-path band 118 may be situation dependent and may be based on the host velocity 108, the host yaw rate 110, and/or a distance 120 from the host vehicle 102.

The path module 116 (or the collision module 114 more generally) can determine that the target 104 is within the in-path band 118, which causes the collision module 114 to determine whether the host vehicle 102 and the target 104 are likely to be within the in-path band 118 at a future time, as discussed further below.

Figure 2:
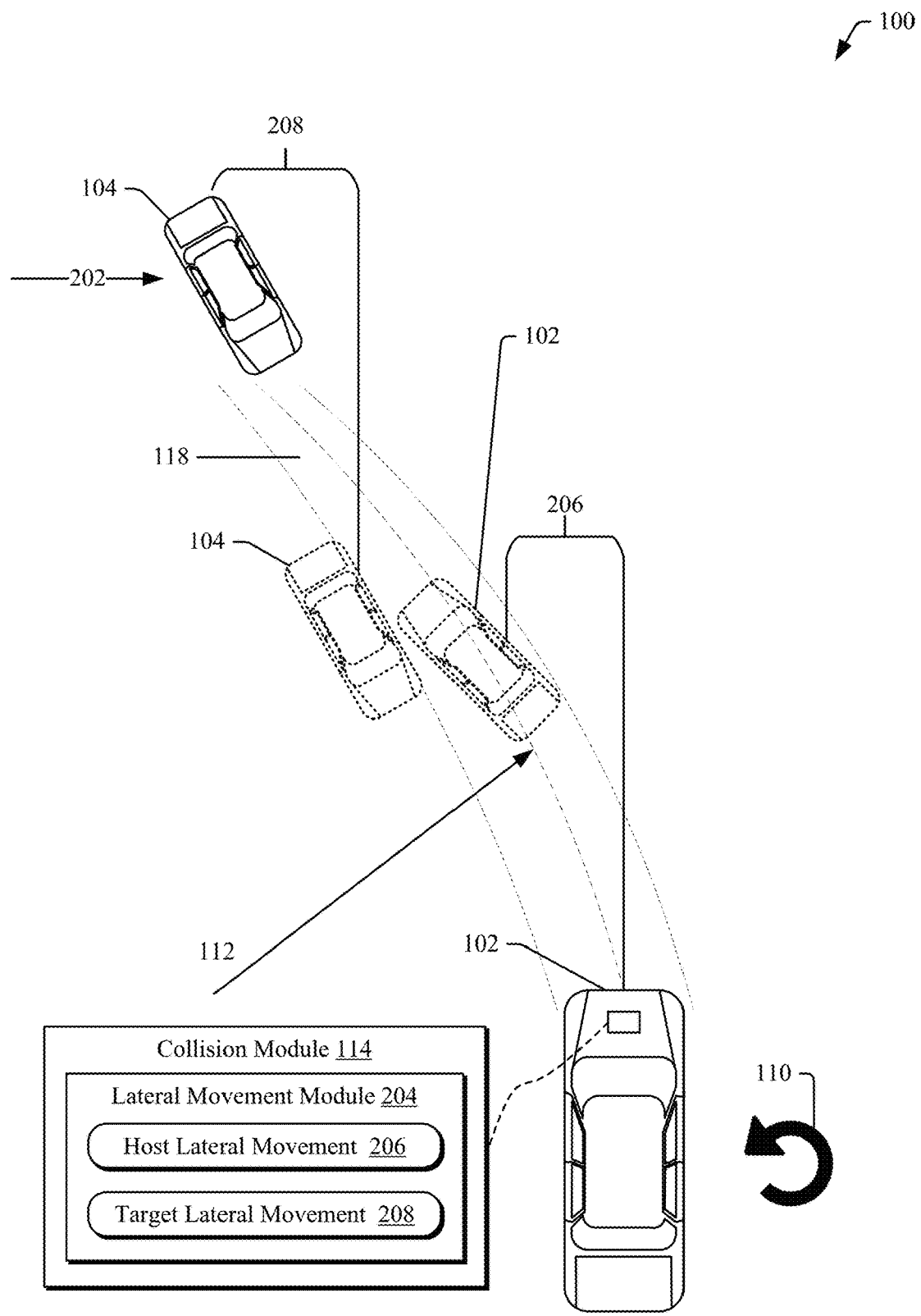
FIG. 2 illustrates, in accordance with techniques of this disclosure, other aspects of the example environment of FIG. 1.

FIG. 2 illustrates further aspects of the example environment 100. The target 104 has a target lateral velocity 202. The target lateral velocity 202 may be a lateral component of a total velocity of the target 104 (not shown). The collision module 114 also contains a lateral movement module 204 that is configured to, responsive to the determination that the target 104 is within the in-path band 118, determine a host lateral movement 206 and a target lateral movement 208. The host lateral movement 206 represents how far laterally the host vehicle 102 is likely to have traveled in a time. The time may be based on a time-to-collision (TTC) with the target 104.

The target lateral movement 208 represents how far laterally the target 104 is likely to have traveled in the time.

The collision module 114 is configured to determine whether the host vehicle 102 and the target 104 are likely to be within the in-path band 122 after the time. If they are likely to be within the in-path band 122, it may be determined that a collision with the target 104 is imminent (subject to optional other factors, as discussed below).

Example System

Figure 3:
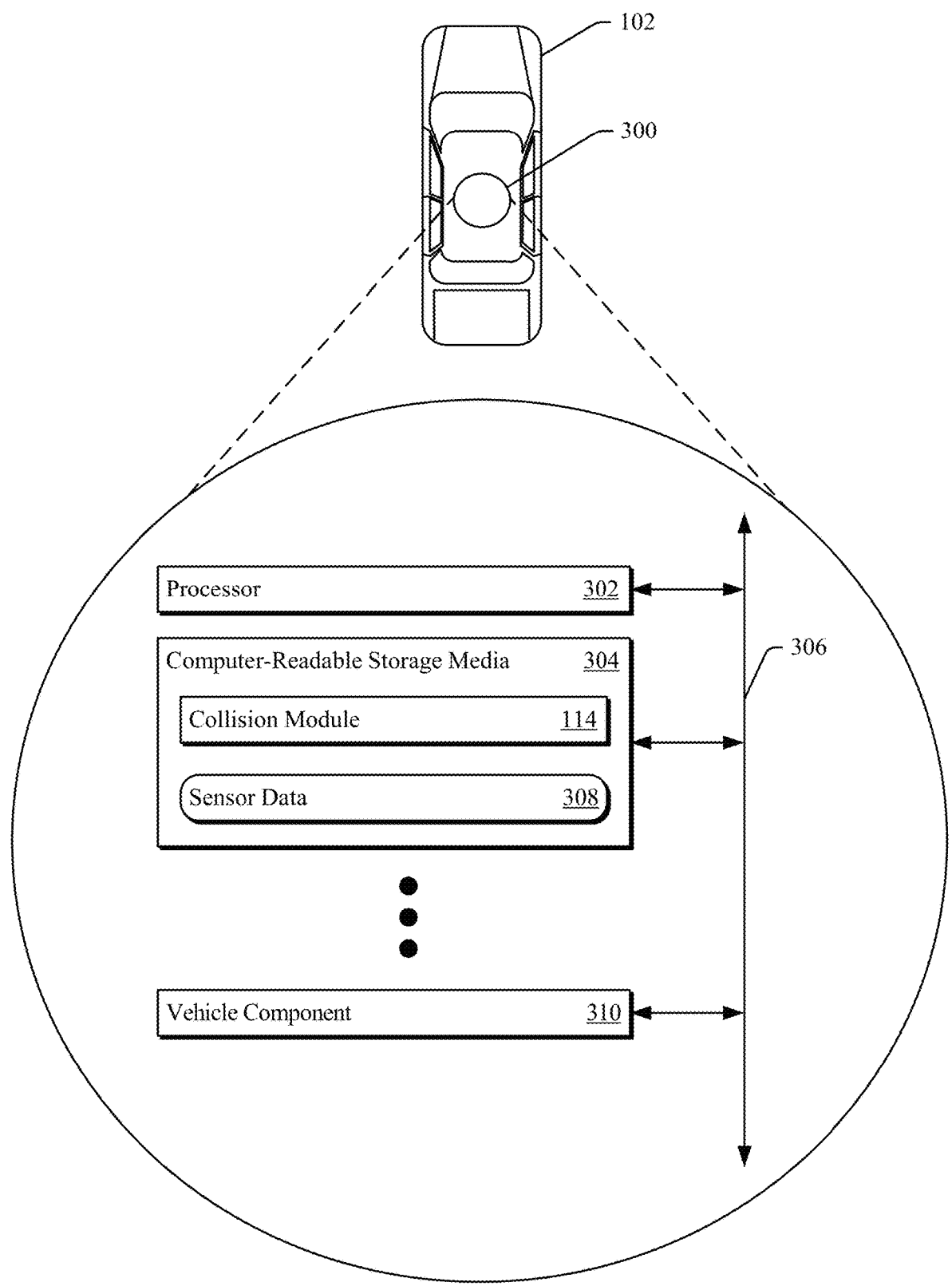
FIG. 3 illustrates, in accordance with techniques of this disclosure, an example system of a host vehicle configured to implement collision indication based on yaw rate and lateral velocity thresholds.

FIG. 3 illustrates an example system 300 configured to be disposed in the host vehicle 102 and configured to implement collision indication based on yaw rate and lateral velocity thresholds. Components of the example system 300 (and sub-components) may be arranged anywhere within or on the host vehicle 102. The example system 300 may include at least one processor 302, computer-readable storage media 304 (e.g., media, medium, mediums), and a vehicle component 310. The components are operatively and/or communicatively coupled via a link 306.

The processor 302 (e.g., application processor, microprocessor, digital-signal processor (DSP), controller) is coupled to the computer-readable storage media 304 via the link 306 and executes instructions (e.g., code) stored within the computer-readable storage media 304 (e.g., non-transitory storage device such as a hard drive, SSD, flash memory, read-only memory (ROM)) to implement or otherwise cause the collision module 114 (or a portion thereof) to perform the techniques described herein. Although shown as being within the computer-readable storage media 304, the collision module 114 (or a portion thereof) may be a stand-alone component (e.g., having dedicated computer-readable storage media comprising instructions and/or executed on dedicated hardware, such as a dedicated processor, pre-programmed field-programmable-gate-array (FPGA), system on chip (SOC), and the like). The processor 302 and the computer-readable storage media 304 may be any number of components, comprise multiple components distributed throughout the host vehicle 102, located remote to the host vehicle 102, dedicated or shared with other components, modules, or systems of the host vehicle 102, and/or configured differently than illustrated without departing from the scope of this disclosure.

The computer-readable storage media 304 also contains sensor data 308 generated by one or more sensors (not shown) that may be local or remote to the example system 300. The sensor data 308 indicates or otherwise enables the determination of information usable to perform the techniques described herein. For example, the sensor data 308 may indicate, or otherwise be used to determine, the path 106, the host velocity 108, the host yaw rate 110, the radius 112, the distance 120, or the target lateral velocity 202.

In some implementations, the sensor data 308 may come from a remote source (e.g., via link 306). The example system 300 may contain a communication system (not shown) that receives sensor data from the target 104 or another remote source. For example, a vehicle-to-vehicle or vehicle-to-everything (V2V/V2X) connection may be used to obtain information usable to perform the techniques described herein.

The vehicle component 310 contains one or more systems or components that are communicatively coupled to the collision module 114 and configured to utilize an output from the collision module 114 (e.g., a collision indication) to perform a function. The vehicle component 310 may affect respective dynamics of the host vehicle 102 (e.g., speed, acceleration, heading, vehicle configuration, vehicle operation or function). For example, the vehicle component 310 may comprise an AEB system that applies a braking force or an ESA system that applies a steering force to mitigate an imminent collision. The vehicle component 310 is communicatively coupled to the collision module 114 via the link 306. Although shown as separate components, the vehicle component 310 may be part of the collision module 114 and visa-versa.

By using the example system 300, the host vehicle 102 may more-accurately determine imminent collisions (e.g., more true positives and less false positives), thereby enabling better utilization of downstream operations (e.g., the vehicle component 310). In doing so, the host vehicle 102 may provide better safety and/or experience for occupants of the host vehicle 102, the target 104, and/or other vehicles or pedestrians.

Example Data Flow

Figure 4:
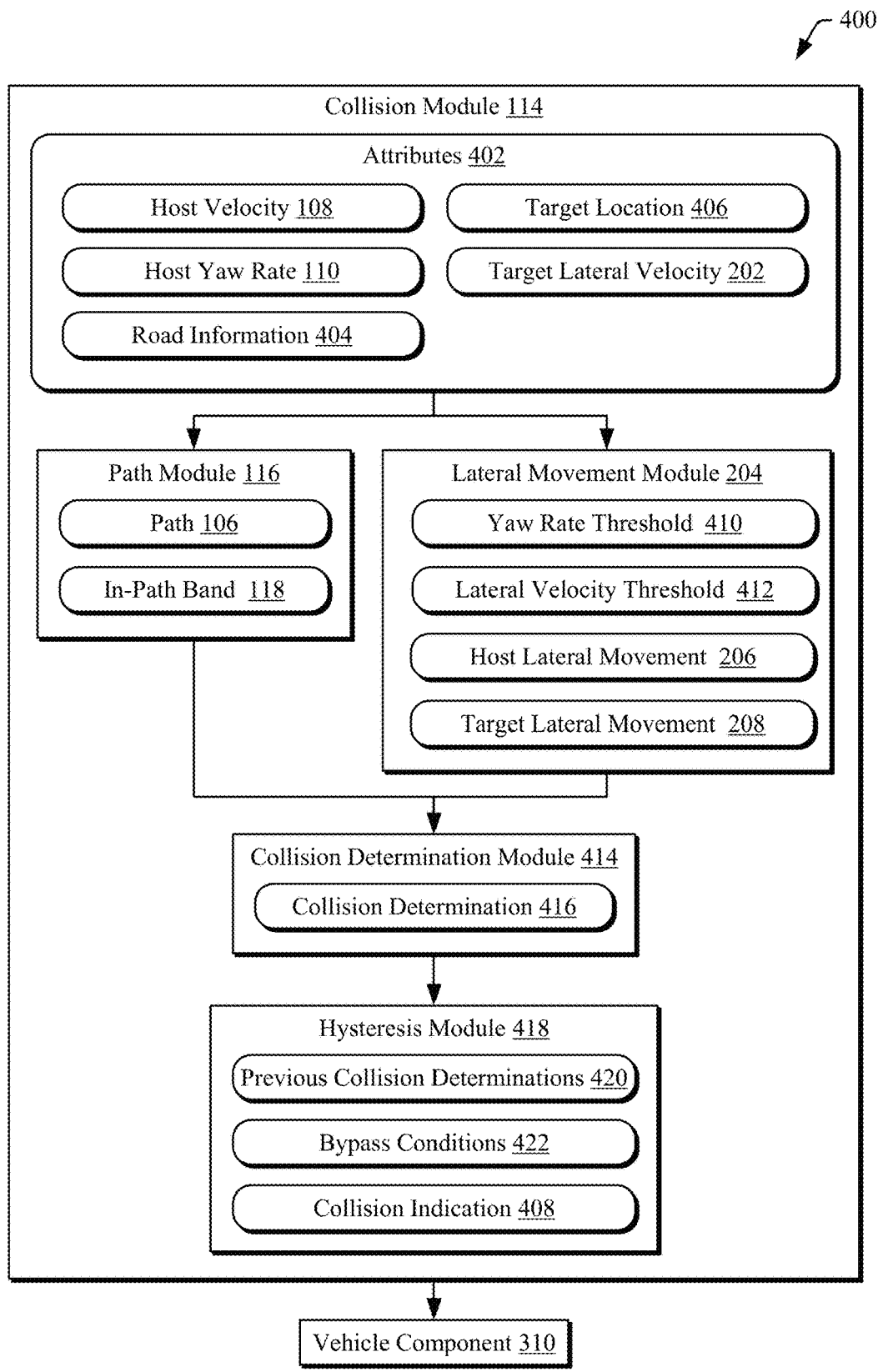
FIG. 4 illustrates, in accordance with techniques of this disclosure, an example data flow for collision indication based on yaw rate and lateral velocity thresholds.

FIG. 4 is an example data flow 400 of collision indication based on yaw rate and lateral velocity thresholds. The example data flow 400 may be implemented in any of the previously described environments and by any of the previously described systems or components. For example, the example data flow 400 can be implemented in the example environment 100 and/or by the example system 300. The example data flow 400 may also be implemented in other environments, by other systems or components, and utilizing other data flows or techniques. Example data flow 400 may be implemented by one or more entities (e.g., the collision module 114). The order in which the operations are shown and/or described is not intended to be construed as a limitation, and the order may be rearranged without departing from the scope of this disclosure. Furthermore, any number of the operations can be combined with any other number of the operations to implement the example data flow or an alternate data flow.

The example data flow 400 starts with attributes 402 of an environment (e.g., example environment 100) being obtained by the collision module 114. As shown, the attributes 402 include the host velocity 108, the host yaw rate 110, road information 404 (e.g., map data, radar-localization data, surrounding objects), a target location 406 (e.g., relative to the host vehicle 102), and the target lateral velocity 202.

The attributes 402 may be acquired, received, or determined by the collision module 114 in any way known by those of ordinary skill in the art. For example, the collision module 114 may determine the attributes 402 directly from the sensor data 308, from a bus or interface connected to sensors that interface with the example system 300, or from another module or system of the example system 300. Regardless of how or where the attributes 402 are gathered, received, derived, or calculated, the collision module 114 is configured to use the attributes 402 to determine a collision indication 408.

In furtherance of the example data flow 400, the attributes 402 are input into the path module 116. The path module 116 is configured to determine the path 106 and the in-path band 118. The path 106 may be based on the host velocity 108 and the host yaw rate 110 and includes the radius 112. As discussed above, the in-path band 118 may be regressive in width along the path 106 away from the host vehicle 102. An amount of the regression may be based on the host velocity 108, the host yaw rate 110, and the distance 120 (determined from the target location 406).

The attributes 402 are also input into the lateral movement module 204. The lateral movement module 204 is configured to determine the host lateral movement 206 and the target lateral movement 208. In order to do so, the lateral movement module 204 calculates a yaw rate threshold 410 for the host vehicle 102. The yaw rate threshold 410 may be based on the host velocity 108, a driver input (e.g., the host yaw rate 110), and/or the road information 404. The yaw rate threshold 410 represents a minimum yaw rate to estimate the host lateral movement 206. For example, the host lateral movement 206 may be determined according to Equation 1.

$$\begin{cases} 0, |\omega| < \omega_{min} \\ 2R\sin^2\frac{\omega\Delta t}{2}, |\omega| \geq \omega_{min} \end{cases} \quad (1)$$

where $\omega$ is the host yaw rate 110, $\omega_{min}$ is the yaw rate threshold 410, R is the radius 112, and $\Delta t$ is the time (e.g., the TTC with the target 104).

The lateral movement module 204 also calculates a lateral velocity threshold 412 for the target 104. The lateral velocity threshold 412 may be based on the velocity of the target (e.g., the target lateral velocity 202), the distance 120, and/or the road information 404. The lateral velocity threshold 412 represents a minimum target lateral velocity 202 to estimate the target lateral movement 208. For example, the target lateral movement 208 may be determined according to Equation 2.

$$\begin{cases} 0, |v_{lat}| < v_{lat\_min} \\ v_{lat}\Delta t, |v_{lat}| \geq v_{lat\_min} \end{cases} \quad (2)$$

where $v_{lat}$ is the target lateral velocity 202 and $v_{lat\_min}$ is the lateral velocity threshold 412.

The host lateral movement 206, the target lateral movement 208 and the in-path band 118 are received by a collision determination module 414. The collision determination module 414 is configured to determine whether the host vehicle 102 and/or the target 104 are likely to be within the in-path band 118 at the time. In order to do so, the collision determination module 414 may determine whether the lateral movements (e.g., the host lateral movement 206 and the target lateral movement 208) are still within the in-path band 118. If they are, a collision determination 416 may be made.

The collision determination 416 may be received by a hysteresis module 418 that is configured to determine if the collision determination 416 should become the collision indication 408. In order to do so, the hysteresis module 418 may determine if there are any previous collision determinations 420 for the target 104. In other words, the hysteresis module 418 may only generate the collision indication 408 responsive to determining that the target 104 has been a threat (e.g., has had a collision determination 416) for a certain amount of time. Doing so mitigates false positives that may otherwise be generated based on instant spikes in the attributes 402 (e.g., due to transient conditions or measurement noise or disturbance from sensors).

Alternatively to, or in conjunction with, the previous collision determinations 420, the hysteresis module 418 may look to see if any bypass conditions 422 are met. The bypass conditions 422 may comprise a determination that the target is outside of a road that the host vehicle 102 is traveling (e.g., based on the target location 406 and the road information 404). In other words, the hysteresis module 418 may ensure that the target 104 is within the road prior to generating the collision indication 408.

The bypass conditions 422 may also comprise a determination that the host vehicle 102 is driving straight while the target 104 is turning. Conversely, the bypass conditions 422 may also comprise a determination that the host vehicle 102 is turning while the target 104 is moving straight. In other words, the hysteresis module 418 may ensure that the host vehicle 102 is not driving straight while the target 104 is turning or that the host vehicle 102 is not turning while the target 104 is moving straight prior to generating the collision indication 408.

Although shown as being within the collision module 114, the path module 116, the lateral movement module 204, the collision determination module 414, and/or the hysteresis module 418 may be separate from the collision module 114. For example, the path module 116, the lateral movement module 204, the collision determination module 414, or the hysteresis module 418 may be a stand-alone component and/or executed via dedicated hardware.

The collision indication 408 is then output for receipt by the vehicle component 310. The vehicle component 310 uses the collision indication 408 to alter a function of the host vehicle 102. For example, the vehicle component 310 may cause an alert (visual, audio, and/or haptic), alter a steering angle of the host vehicle 102, apply a braking force to the host vehicle 102, or change an operation of a semi-autonomous or autonomous function of the host vehicle. It should be noted that the vehicle component 310 may represent multiple functions or systems that receive the collision indication 408.

By using the above techniques, the collision indication 408 may be based on a width-regressive in-path band, yaw rate and lateral velocity thresholds that determine how to calculate lateral movements, hysteresis conditions, and/or bypass scenarios not being met. In this way, the collision indication 408 is more accurate in more environments and situations. Consequently, more true positives are generated, and more false positives are avoided, leading to increased safety of passengers of the host vehicle 102, the target 104, and/or other people proximate the host vehicle 102.

Example Method

Figure 5:
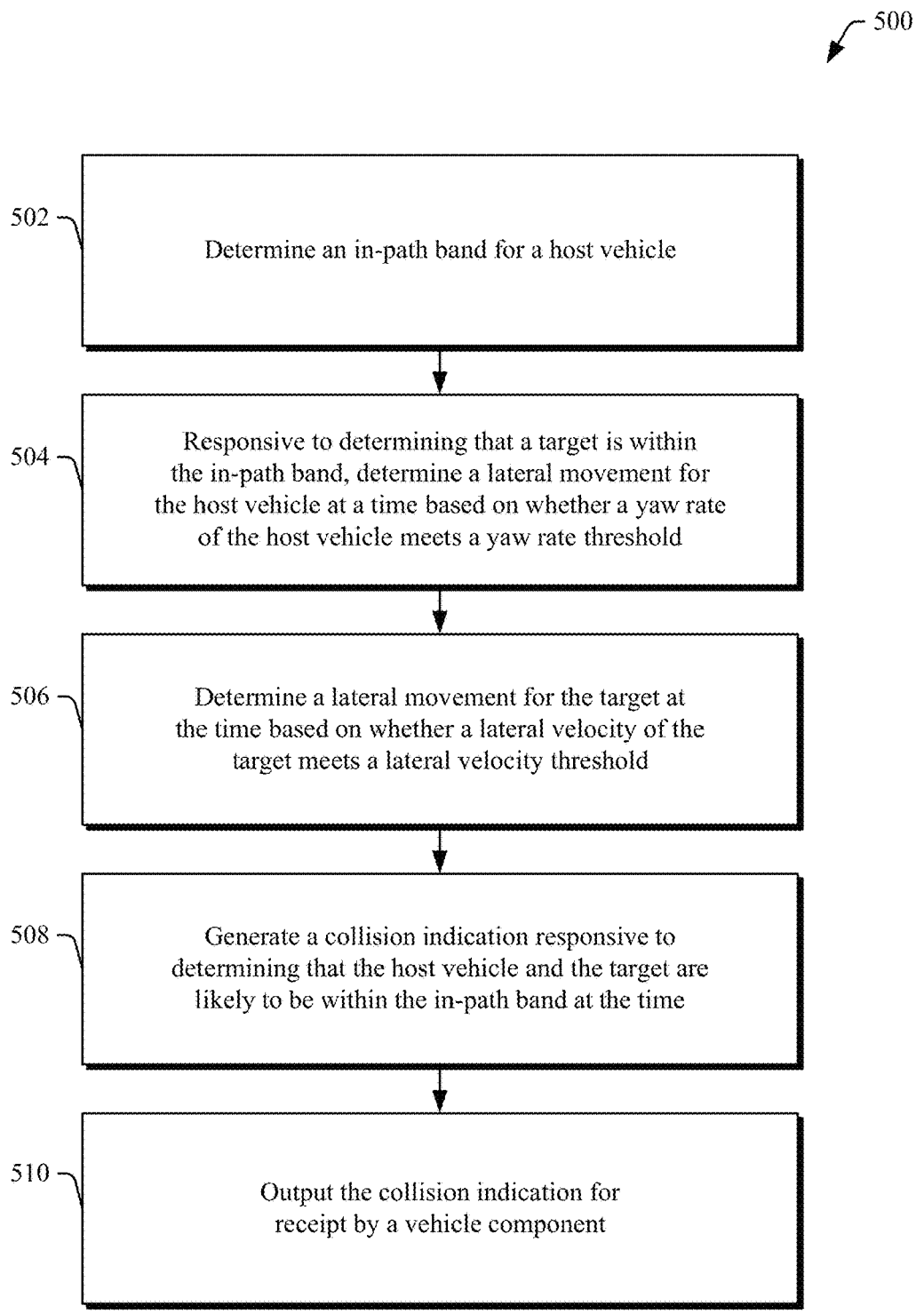
FIG. 5 illustrates, in accordance with techniques of this disclosure, an example method of collision indication based on yaw rate and lateral velocity thresholds.

FIG. 5 is an example method 500 for collision indication based on yaw rate and lateral velocity thresholds. The example method 500 may be implemented in any of the previously described environments, by any of the previously described systems or components, and utilizing any of the previously described data flows, process flows, or techniques. For example, the example method 500 can be implemented in the example environment 100, by the example system 300, and/or by following the example data flow 400. The example method 500 may also be implemented in other environments, by other systems or components, and utilizing other data flows, process flows, or techniques. Example method 500 may be implemented by one or more entities (e.g., the collision module 114). The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At 502, an in-path band for a host vehicle is determined. For example, the path module 116 may determine the in-path band 118 for the host vehicle 102 based on the path 106, the host velocity 108, the host yaw rate 110, and/or the distance 120.

At 504, responsive to determining that a target is within the in-path band, a lateral movement for the host vehicle at a time is determined based on whether a yaw rate of the host vehicle meets a yaw rate threshold. For example, the path module 116 may determine that the target 104 is within the in-path band 118 and the lateral movement module 204 may determine the yaw rate threshold 410 and use it to determine the host lateral movement 206 at the time (e.g., the TTC with the target 104).

At 506, a lateral movement for the target at the time is determined based on whether a lateral velocity of the target meets a lateral velocity threshold. For example, the lateral movement module 204 may determine the lateral velocity threshold 412 and use it to determine the target lateral movement 208 at the time.

At 508, a collision indication is generated responsive to determining that the host vehicle and the target are likely to be within the in-path band at the time. For example, the collision determination module 414 may generate the collision determination 416 and pass it to the hysteresis module 418 to generate the collision indication 408.

At 510, the collision indication is output for receipt by a vehicle component. For example, the hysteresis module 418 may output the collision indication 408 for receipt by the vehicle component 310 to alter a function of the host vehicle 102.

By influencing a collision indication based on the example method 800, a more accurate collision indication may be generated. In doing so, efficacy of downstream operations (e.g., the vehicle component 310) is improved while ensuring that such operations are not unnecessarily activated (e.g., false-positive steering/braking events). Consequently, safety and experience of humans (and other objects) in and around the host vehicle 102 may be improved.

EXAMPLES

Example 1: A method comprising: determining a predicted path of a host vehicle; determining an in-path band for the predicted path, the in-path band being centered on the predicted path and regressive in width along the predicted path away from the host vehicle; determining whether a target is within the in-path band; and responsive to determining that the target is within the in-path band: determining a yaw rate of the host vehicle; determining a yaw rate threshold for the host vehicle, the yaw rate threshold being usable to determine how to determine a host lateral movement of the host; determining the host lateral movement based on whether the yaw rate of the host vehicle meets the yaw rate threshold; determining, based on the host lateral movement and the in-path band, whether the host vehicle is likely to be within the in-path band at a future time; determining a lateral velocity of the target; determining a lateral velocity threshold for the target, the lateral velocity threshold being usable to determine how to determine a target lateral movement of the target; determining the target lateral movement based on whether the lateral velocity of the target meets the lateral velocity threshold; determining, based on the target lateral movement and the in-path band, whether the target is likely to be within the in-path band at the future time; responsive to determining that the host vehicle and the target are likely to be within the in-path band at the future time, generating a collision indication; and responsive to generating the collision indication, causing the host vehicle to perform an action.

Example 2: The method of example 1, wherein the predicted path is based on the yaw rate of the host vehicle and a velocity of the host vehicle.

Example 3: The method of example 1 or 2, wherein an amount of width regression of the in-path band is based on at least one of: a velocity of the host vehicle, the yaw rate, or a distance between the host vehicle and the target.

Example 4: The method of example 1, 2, or 3, wherein the yaw rate threshold is based on at least one of: a velocity of the host vehicle, the yaw rate, or road information.

Example 5: The method of any preceding example, wherein the determining the host lateral movement comprises: determining the host lateral movement to be zero responsive to determining that the yaw rate does not meet the yaw rate threshold; or determining the host lateral movement based on a radius of curvature of the predicted path, the yaw rate, and the future time responsive to determining that the yaw rate does meet the yaw rate threshold.

Example 6: The method of any preceding example, wherein the future time comprises an estimated time-to-collision between the host vehicle and the target.

Example 7: The method of any preceding example, wherein the lateral velocity threshold is based on at least one of: a velocity of the target, a distance between the host vehicle and the target, or road information.

Example 8: The method of any preceding example, wherein the determining the target lateral movement comprises: determining the target lateral movement to be zero responsive to determining that the lateral velocity does not meet the lateral velocity threshold; or determining the target lateral movement based on a radius of curvature of the predicted path, the yaw rate, and the future time responsive to determining that the lateral velocity does meet the lateral velocity threshold.

Example 9: The method of any preceding example, wherein the generating the collision indication is further responsive to at least one of: identifying previous determinations that the host vehicle and the target are likely to be within the in-path band at the future time; determining that the target is within a road that the host vehicle is traveling on; determining that the host vehicle is not driving straight while the target is turning; or determining the host vehicle is not changing lanes or turning while the target is driving straight.

Example 10: A system comprising at least one processor configured to: determine a predicted path of a host vehicle; determine an in-path band for the predicted path, the in-path band being centered on the predicted path and regressive in width along the predicted path away from the host vehicle; determine whether a target is within the in-path band; and responsive to determining that the target is within the in-path band: determine a yaw rate of the host vehicle; determine a yaw rate threshold for the host vehicle, the yaw rate threshold being usable to determine how to determine a host lateral movement of the host; determine the host lateral movement based on whether the yaw rate of the host vehicle meets the yaw rate threshold; determine, based on the host lateral movement and the in-path band, whether the host vehicle is likely to be within the in-path band at a future time; determine a lateral velocity of the target; determine a lateral velocity threshold for the target, the lateral velocity threshold being usable to determine how to determine a target lateral movement of the target; determine the target lateral movement based on whether the lateral velocity of the target meets the lateral velocity threshold; determine, based on the target lateral movement and the in-path band, whether the target is likely to be within the in-path band at the future time; responsive to determining that the host vehicle and the target are likely to be within the in-path band at the future time, generate a collision indication.

Example 11: The system of example 10, wherein the predicted path is based on the yaw rate of the host vehicle and a velocity of the host vehicle.

Example 12: The system of example 10 or 11, wherein an amount of width regression of the in-path band is based on at least one of: a velocity of the host vehicle, the yaw rate, or a distance between the host vehicle and the target.

Example 13: The system of example 10, 11, or 12, wherein the yaw rate threshold is based on at least one of: a velocity of the host vehicle, the yaw rate, or road information.

Example 14: The system of any of examples 10-13, wherein the determination of the host lateral movement comprises: determining the host lateral movement to be zero responsive to determining that the yaw rate does not meet the yaw rate threshold; or determining the host lateral movement based on a radius of curvature of the predicted path, the yaw rate, and the future time responsive to determining that the yaw rate does meet the yaw rate threshold.

Example 15: The system of any of examples 10-14, wherein the future time comprises an estimated time-to-collision between the host vehicle and the target.

Example 16: The system of any of examples 10-15, wherein the lateral velocity threshold is based on at least one of: a velocity of the target, a distance between the host vehicle and the target, or road information.

Example 17: The system of any of examples 10-16, wherein the determination of the target lateral movement comprises: determining the target lateral movement to be zero responsive to determining that the lateral velocity does not meet the lateral velocity threshold; or determining the target lateral movement based on a radius of curvature of the predicted path, the yaw rate, and the future time responsive to determining that the lateral velocity does meet the lateral velocity threshold.

Example 18: The system of any of examples 10-17, wherein the generation of the collision indication is further responsive to an identification of previous determinations that the host vehicle and the target are likely to be within the in-path band at the future time.

Example 19: The system of any of examples 10-18, wherein the generation of the collision indication is further responsive to at least one of: a determination that the target is within a road that the host vehicle is traveling on; a determination that the host vehicle is not driving straight while the target is turning; or a determination that the host vehicle is not changing lanes or turning while the target is driving straight.

Example 20: Computer-readable storage media comprising instructions that, when executed by at least one processor, cause the processor to: determine a predicted path of a host vehicle; determine an in-path band for the predicted path, the in-path band being centered on the predicted path and regressive in width along the predicted path away from the host vehicle; determine whether a target is within the in-path band; and responsive to determining that the target is within the in-path band: determine a yaw rate of the host vehicle; determine a yaw rate threshold for the host vehicle, the yaw rate threshold being usable to determine how to determine a host lateral movement of the host; determine the host lateral movement based on whether the yaw rate of the host vehicle meets the yaw rate threshold; determine, based on the host lateral movement and the in-path band, whether the host vehicle is likely to be within the in-path band at a future time; determine a lateral velocity of the target; determine a lateral velocity threshold for the target, the lateral velocity threshold being usable to determine how to determine a target lateral movement of the target; determine the target lateral movement based on whether the lateral velocity of the target meets the lateral velocity threshold; determine, based on the target lateral movement and the in-path band, whether the target is likely to be within the in-path band at the future time; responsive to determining that the host vehicle and the target are likely to be within the in-path band at the future time, generate a collision indication.

Example 21: A system comprising: a processor configured to perform the method of any of examples 1-9.

Example 22: Computer-readable storage media comprising instructions that, when executed by at least one processor, cause the processor or an associated system to perform the method of any of examples 1-9.

Example 23: A system comprising means for performing the method of any of examples 1-9.

Example 24: A method performed by the system of any of examples 10-19.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   determining whether a target is within an in-path band for a predicted path of a host vehicle, the in-path band being centered on the predicted path and regressive in width along the predicted path away from the host vehicle; and
   responsive to determining that the target is within the in-path band:
     determining a yaw rate threshold for the host vehicle, the yaw rate threshold being usable to determine how to determine a host lateral movement of the host vehicle;
     determining the host lateral movement based on whether a yaw rate of the host vehicle meets the yaw rate threshold;
     determining, based on the host lateral movement and the in-path band, whether the host vehicle is likely to be within the in-path band at a future time;
     determining a lateral velocity threshold for the target, the lateral velocity threshold being usable to determine how to determine a target lateral movement of the target;
     determining the target lateral movement based on whether a lateral velocity of the target meets the lateral velocity threshold;
     determining, based on the target lateral movement and the in-path band, whether the target is likely to be within the in-path band at the future time; and
     responsive to determining that the host vehicle and the target are likely to be within the in-path band at the future time, generating a collision indication;
   wherein the host vehicle is configured to perform an action in response to the collision indication.

2. The method of claim 1, wherein the predicted path is based on the yaw rate of the host vehicle and a velocity of the host vehicle.

3. The method of claim 1, wherein an amount of width regression of the in-path band is based on at least one of: a velocity of the host vehicle, the yaw rate, or a distance between the host vehicle and the target.

4. The method of claim 1, wherein the yaw rate threshold is based on at least one of: a velocity of the host vehicle, the yaw rate, or road information.

5. The method of claim 1, wherein the determining the host lateral movement comprises:
   determining the host lateral movement to be zero responsive to determining that the yaw rate does not meet the yaw rate threshold; or
   determining the host lateral movement based on a radius of curvature of the predicted path, the yaw rate, and the future time responsive to determining that the yaw rate does meet the yaw rate threshold.

6. The method of claim 1, wherein the future time comprises an estimated time-to-collision between the host vehicle and the target.

7. The method of claim 1, wherein the lateral velocity threshold is based on at least one of: a velocity of the target, a distance between the host vehicle and the target, or road information.

8. The method of claim 1, wherein the determining the target lateral movement comprises:
   determining the target lateral movement to be zero responsive to determining that the lateral velocity does not meet the lateral velocity threshold; or
   determining the target lateral movement based on a radius of curvature of the predicted path, the yaw rate, and the future time responsive to determining that the lateral velocity does meet the lateral velocity threshold.

9. The method of claim 1, wherein the generating the collision indication is further responsive to at least one of:
   identifying previous determinations that the host vehicle and the target are likely to be within the in-path band at the future time;
   determining that the target is within a road that the host vehicle is traveling on;
   determining that the host vehicle is not driving straight while the target is turning; or
   determining the host vehicle is not changing lanes or turning while the target is driving straight.

10. A system comprising at least one processor configured to:
    determine whether a target is within an in-path band for a predicted path of a host vehicle, the in-path band being centered on the predicted path and regressive in width along the predicted path away from the host vehicle; and
    responsive to determining that the target is within the in-path band:
      determine a yaw rate threshold for the host vehicle, the yaw rate threshold being usable to determine how to determine a host lateral movement of the host vehicle;
      determine the host lateral movement based on whether a yaw rate of the host vehicle meets the yaw rate threshold;
      determine, based on the host lateral movement and the in-path band, whether the host vehicle is likely to be within the in-path band at a future time;
      determine a lateral velocity threshold for the target, the lateral velocity threshold being usable to determine how to determine a target lateral movement of the target;
      determine the target lateral movement based on whether a lateral velocity of the target meets the lateral velocity threshold;
      determine, based on the target lateral movement and the in-path band, whether the target is likely to be within the in-path band at the future time; and
      responsive to determining that the host vehicle and the target are likely to be within the in-path band at the future time, generate a collision indication
    wherein the host vehicle is configured to perform an action in response to the collision indication.

11. The system of claim 10, wherein the predicted path is based on the yaw rate of the host vehicle and a velocity of the host vehicle.

12. The system of claim 10, wherein an amount of width regression of the in-path band is based on at least one of: a velocity of the host vehicle, the yaw rate, or a distance between the host vehicle and the target.

13. The system of claim 10, wherein the yaw rate threshold is based on at least one of: a velocity of the host vehicle, the yaw rate, or road information.

14. The system of claim 10, wherein the determination of the host lateral movement comprises:

determining the host lateral movement to be zero responsive to determining that the yaw rate does not meet the yaw rate threshold; or determining the host lateral movement based on a radius of curvature of the predicted path, the yaw rate, and the future time responsive to determining that the yaw rate does meet the yaw rate threshold.

15. The system of claim 10, wherein the future time comprises an estimated time-to-collision between the host vehicle and the target.

16. The system of claim 10, wherein the lateral velocity threshold is based on at least one of: a velocity of the target, a distance between the host vehicle and the target, or road information.

17. The system of claim 10, wherein the determination of the target lateral movement comprises:

determining the target lateral movement to be zero responsive to determining that the lateral velocity does not meet the lateral velocity threshold; or determining the target lateral movement based on a radius of curvature of the predicted path, the yaw rate, and the future time responsive to determining that the lateral velocity does meet the lateral velocity threshold.

18. The system of claim 10, wherein the generation of the collision indication is further responsive to an identification of previous determinations that the host vehicle and the target are likely to be within the in-path band at the future time.

19. The system of claim 10, wherein the generation of the collision indication is further responsive to at least one of:

a determination that the target is within a road that the host vehicle is traveling on;

a determination that the host vehicle is not driving straight while the target is turning; or a determination that the host vehicle is not changing lanes or turning while the target is driving straight.

20. A computer-readable storage media comprising instructions that, when executed by at least one processor, cause the processor to:

determine whether a target is within an in-path band for a predicted path of a host vehicle, the in-path band being centered on the predicted path and regressive in width along the predicted path away from the host vehicle; and responsive to determining that the target is within the in-path band:

determine a yaw rate threshold for the host vehicle, the yaw rate threshold being usable to determine how to determine a host lateral movement of the host vehicle;

determine the host lateral movement based on whether a yaw rate of the host vehicle meets the yaw rate threshold;

determine, based on the host lateral movement and the in-path band, whether the host vehicle is likely to be within the in-path band at a future time;

determine a lateral velocity threshold for the target, the lateral velocity threshold being usable to determine how to determine a target lateral movement of the target;

determine the target lateral movement based on whether a lateral velocity of the target meets the lateral velocity threshold;

determine, based on the target lateral movement and the in-path band, whether the target is likely to be within the in-path band at the future time; and responsive to determining that the host vehicle and the target are likely to be within the in-path band at the future time, generate a collision indication;

wherein the host vehicle is configured to perform an action in response to the collision indication.

21. The method recited by claim 1, wherein the host vehicle is further configured to perform the action to avoid a collision with the target.

22. The method recited by claim 1, wherein the action includes at least one of applying a braking force with a braking system or providing a steering input to a steering system to avoid a collision with the target.

* * * * *